May 25, 1965 K. GERLACH 3,184,839
METHOD AND DEVICE FOR RECONDITIONING WORN RAILROAD RAILS
Filed Dec. 18, 1962
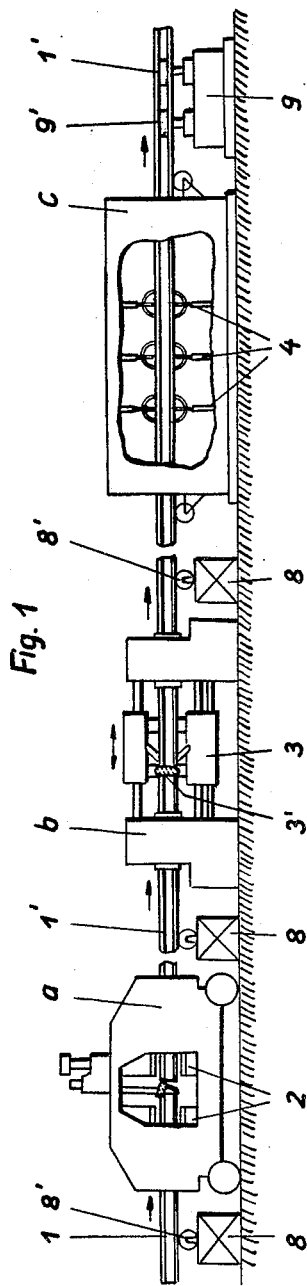
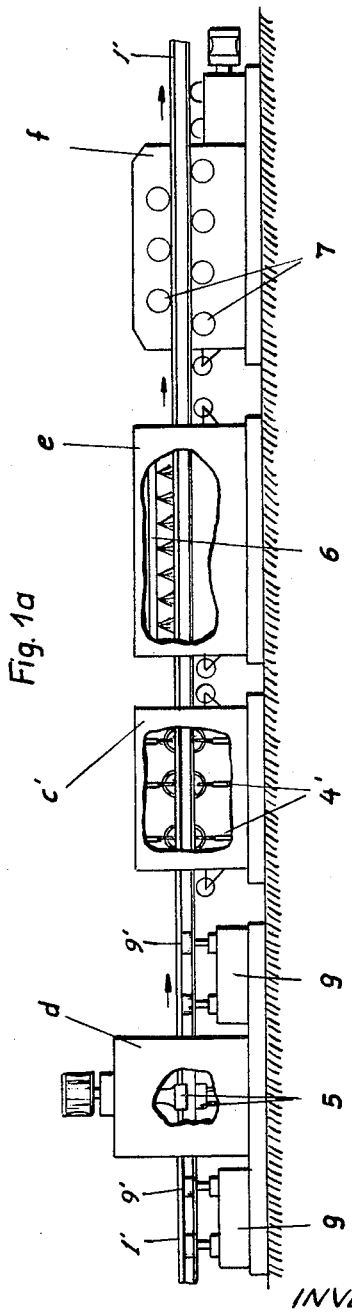
INVENTOR:
KARL GERLACH
BY Robert H Jacob
AGT.

United States Patent Office 3,184,839
Patented May 25, 1965

3,184,839
METHOD AND DEVICE FOR RECONDITIONING
WORN RAILROAD RAILS
Karl Gerlach, Homberger Strasse 86,
Moers, Lower Rhineland, Germany
Filed Dec. 18, 1962, Ser. No. 245,516
Claims priority, application Germany, Dec. 27, 1961,
G 33,904
5 Claims. (Cl. 29—401)

This invention is concerned with a method and device for reconditioning railroad rails.

It is well-known in the art that railroad rails of equal or different length are connected with each other at their ends by the electric resistance-buttwelding process so as to form a practically endless rail track. This method is applicable to worn but still useable rails as well as to new rails. In the case of worn but still usable rails, reprofiling of the rail head on the tread as well as on the running edge of the rail is effected either by planing or milling or—in accordance with a new and improved method not belonging to the prior art and as claimed in U.S. Patent No. 3,133,343—by a non-cutting shaping operation by mechanical hot hammering.

In the case of new rails, however, the mechanical working of the rails after having been connected with each other by welding is limited to the shearing off of the icicle of the welded joints. However, the railroad rails joined by welding and machined in accordance with the well-known process are no longer able to meet the requirements made, in particular, in view of the intended considerable increases of traveling speeds, and even not if the rails are surface hardened or consist of rolled steels having a high degree of natural hardness. The reason for this is not so much to be found in an unsatisfactory wear resistance as rather in the fact that the butt-welded joints of the rails, as a consequence of the compressing operation during the flash-buttwelding, form hardened zones, socalled "hardness nodes," with soft zones joining up on both sides with these hardened zones. Experience has shown that the alternating succession of such hard and soft zones leads to the formation of bump and trough shaped unevennesses of the rail head during railroad operation. Experiments which have been made to overcome this disadvantage by subsequent annealing of the rails within the zone of the welded joints have not given satisfactory results.

The invention has for its object the elimination of this disadvantage; more particularly, the invention is concerned with a method for re-conditioning of railroad rails made of steel by continually end-to-end welding of worn and/or new rails so as to form a practically endless rail track, by subsequent mechanical working and thermal treatment of the rail track formed by welding together of individual lengths of rail, and by final cross-cutting to lengths required in view of transportation conditions and as required for track laying. This new method is distinguished from well-known methods of this kind essentially thereby that the rail track after having passed the rail welding and icicle shearing machine is subjected to a heating operation progressing over the entire length of the rail track, which heating is effected up to temperatures which are equal or approximately equal to the normalizing or annealing temperature of rail steel, i.e., temperatures ranging between 800° and 900° C., slightly above the conversion point $Ac_3$ of conventional rail steel, which temperatures are also applicable for shaping and hardening of the steel.

The progressive heating of the endless rail track is reasonably effected in a pusher type furnace. The result of this operation is that the "hardness nodes" at the welded joints of the rail track are eliminated and the degree of hardness along the rail is rendered uniform by the continual shift of the hardness transition zones that have developed in the zones of the welded joints. The method described could thus be considered as complete after the normalizing operation of welded endless rail tracks has been finished.

However, it has been found especially advantageous when the aforesaid operation is combined with a re-profiling or levelling non-cutting shaping of the rail head in the form of a mechanical high-speed forging operation. This high-speed forging operation consists in that one or several top and bottom tools of a mechanical hammer act on the running edge and the tread of the rail track passing through said mechanical hammer. In such a case, the same progressive heating of the rail track can be utilized for the mechanical working as well as for a subsequent thermal treatment, which preferably consists of a tempering operation of the rail track by quenching of the rail head with subsequent automatic drawing of the rail head by means of the heat flowing back from the rail base, the rail web and the center of the rail head. If necessary, an intermediate heating can be effected prior to the tempering operation in order to compensate for the temperature drop caused by the forging operation. The rail track treated in accordance with the method described also shows an improved surface quality which never has been obtained before and which, owing to a material structure of comparably higher density, is characterized by greater resistance to corrosion of the rail as well as by an improved wear resistance due to the material hardening effected. It is finally possible by the combination of the different steps of the new method described that unavoidable rolling tolerances of new rails can be largely eliminated, so that relatively low cost standard rails can be given a quality coefficient which corresponds to that of the rather expensive age-hardened rails or such made from self-hardening steel. All these advantages, however, also apply to the method and device in accordance with the invention when used for the re-conditioning of worn rails, in particular, since the re-conditioning suggested according to the invention is characterized by a high degree of economy and makes it possible to classify the re-conditioned rail into a rail quality class of higher order.

These and many other objects and advantageous features of the method in accordance with the invention will no doubt appear to those skilled in the art from the following detailed description drawn in conjunction with the accompanying drawings which show in schematic representation a complete plant for the carrying out of the method claimed in this application. The individual components of this complete plant are arranged in series so as to form one line. Owing to lack of space, however, the series of components is represented in the drawing in two sections one beneath the other.

The worn or new rails 1 supplied from the rail depot are welded continuously to each other in a butt-welding machine $a$, which is movable within certain limits, and which is equipped with clamping jaws 2, so that a practically endless rail track is formed. This rail track is then passed through a series arranged de-burring device $b$ with a reciprocating planing slide 3 which removes the beads on the welded joints. The rail track is then heated during its passage through a continuous-type furnace $c$ equipped with burners 4. The heated rail track 1' then passes through a mechanical high-speed hammer $d$ with exchangeable top and bottom tools 5 which are adapted to the rail head and serve for re-profiling or leveling and hardening of the running edge and the tread of the rail head. After this operation, the rail track 1' passes through another continuous-type furnace $c'$ equipped with the burners 4' where it is again heated up to hardening temperature, and from there it is passed through a quenching device *e* with a water spraying pipe 6 where quenching within the zone of the rail head is effected. The mechanical working and thermal treatment of the rail 1 or the rail track 1' as disclosed in this application is finally completed by a straightening operation in the re-alignment machine *f* which is equipped with straightening rollers 7. Pull-through trestles 9 with pairs of driving rollers 9' and trestles 8 with guide rollers 8' are provided for the movement of the rail track 1' through the complete plant consisting of the devices *a, b, c, c', d, e, f*.

I claim:

1. Method for conditioning steel rails including the steps of welding together the ends of rails to form a continuous rail track, removing the beads at the welded joint by a shearing operation and subjecting the entire length of the rail track progressively to a heat treatment preferably in a continuous type furnace at a temperature ranging slightly above the conversion point $Ac_3$ of the normal annealing temperatures of rail steel.

2. Method for conditioning steel rails including the steps of welding together the ends of rails to form a continuous rail track, removing the beads at the welded joint by a shearing operation and subjecting the entire length of the rail track progressively to a heat treatment preferably in a continuous type furnace at a temperature ranging slightly above the conversion point $Ac_3$ of the normal annealing temperatures of rail steel and subjecting the rail to a non-cutting hot-shaping and hardening operation in a reprofiling device such as a high speed hammer.

3. Method for conditioning steel rails including the steps of welding together the ends of rails to form a continuous rail track, removing the beads at the welded joint by a shearing operation and subjecting the entire length of the rail track progressively to a heat treatment preferably in a continuous type furnace at a temperature ranging slightly above the conversion point $Ac_3$ of the normal annealing temperatures of rail steel, subjecting the rail to a non-cutting hot-shaping and hardening operation in a reprofiling device such as a high speed hammer, then after reaching the hardening temperature subjecting the head of the heat treated rail to a quenching operation by means of water and subsequently to a straightening operation by means of straightening devices such as rollers.

4. The method for conditioning steel rails as set forth in claim 3, where said tempering operation is effected after the rail track has been heated to shaping temperature and, if necessary, with intermediate heating in order to compensate for the temperature drop caused by the hammering operation.

5. Equipment for conditioning steel rails substantially as herein described, comprising in series arrangement a butt welding machine, a weld bead shearing machine, a mechanical hammer for reprofiling the head of a rail including means for heating and tempering the rail head, and a plurality of rollers arranged before, after and intermediate said machine, hammer, heating and tempering means for guiding and moving rails longitudinally.

References Cited by the Examiner
UNITED STATES PATENTS

| | | | |
|---|---|---|---|
| 1,958,103 | 5/34 | Kelley | 29—33 |
| 2,186,966 | 1/40 | George | 29—401 |
| 2,231,014 | 2/41 | Lytle et al. | 29—487 X |

JOHN F. CAMPBELL, *Primary Examiner.*